(12) United States Patent
Stephens (10) Patent No.: US 11,097,840 B2
(45) Date of Patent: *Aug. 24, 2021

(54) ANTI-PERSONNEL AUTONOMOUS VEHICLE

(71) Applicant: The Boeing Company, Chicago, IL (US)

(72) Inventor: Gentry B. Stephens, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 367 days.

This patent is subject to a terminal disclaimer.

(21) Appl. No.: 16/039,095

(22) Filed: Jul. 18, 2018

(65) Prior Publication Data

US 2020/0023966 A1 Jan. 23, 2020

(51) Int. Cl.
| | |
|---|---|
| *G01C 23/00* | (2006.01) |
| *G05D 1/00* | (2006.01) |
| *B64C 39/02* | (2006.01) |
| *F42B 23/16* | (2006.01) |
| *F42C 19/12* | (2006.01) |
| *G05D 1/10* | (2006.01) |

(52) U.S. Cl.
CPC .......... *B64C 39/024* (2013.01); *F42B 23/16* (2013.01); *F42C 19/12* (2013.01); *G05D 1/0038* (2013.01); *G05D 1/0088* (2013.01); *G05D 1/0094* (2013.01); *G05D 1/101* (2013.01); *B64C 2201/121* (2013.01); *B64C 2201/146* (2013.01)

(58) Field of Classification Search
CPC .... F42C 19/12; G05D 1/0038; G05D 1/0094; G05D 1/101; G05D 1/0088; F42B 6/00; F42B 23/16; F42B 12/202; F42B 12/22; B64C 39/024; B64C 2201/146; B64C 2201/121
USPC ............................................................. 700/3
See application file for complete search history.

(56) References Cited

U.S. PATENT DOCUMENTS

| | | | | |
|---|---|---|---|---|
| 6,467,790 | B1 * | 10/2002 | Hurley ..................... | B60D 1/00 280/480 |
| 8,161,884 | B1 * | 4/2012 | Kokodis ................. | F42B 12/24 102/493 |
| 2017/0069214 | A1 * | 3/2017 | Dupray ................ | G08G 5/0013 |
| 2017/0299358 | A1 * | 10/2017 | Miller ..................... | F42B 12/22 |
| 2017/0328696 | A1 * | 11/2017 | Muller ..................... | F42D 1/05 |
| 2018/0022455 | A1 * | 1/2018 | McCaslin .............. | B64D 47/08 244/137.4 |
| 2018/0290725 | A1 * | 10/2018 | Koessler ................. | B64C 17/02 |
| 2018/0312276 | A1 * | 11/2018 | Miller ................... | B64C 39/022 |
| 2019/0077503 | A1 * | 3/2019 | Reddy ..................... | F42B 15/08 |
| 2019/0088156 | A1 * | 3/2019 | Choi ..................... | F41G 7/2293 |
| 2019/0256210 | A1 * | 8/2019 | Prager ..................... | B64D 1/22 |
| 2019/0291857 | A1 * | 9/2019 | Arsentyev .............. | B64C 27/20 |
| 2019/0360783 | A1 * | 11/2019 | Whittaker ............... | H04K 3/43 |
| 2020/0140085 | A1 * | 5/2020 | Deng .................... | B64D 47/08 |

* cited by examiner

*Primary Examiner* — B M M Hannan
(74) *Attorney, Agent, or Firm* — Felix L. Fischer (57) ABSTRACT

An anti-personnel autonomous vehicle (APAV) system has a fuselage formed by a directional fragmentation weapon (DFW). An unmanned aerial vehicle (UAV) assembly is engaged to the DFW, the UAV assembly having a plurality of lift units positioned to provide balanced lift on the DFW. A control module integrated in the UAV assembly has a wireless transmitter/receiver communicating with a remote controller.

18 Claims, 9 Drawing Sheets

ANTI-PERSONNEL AUTONOMOUS VEHICLE

BACKGROUND INFORMATION

Field

Implementations of the disclosure relate generally to the field of anti-personnel explosive devices and more particularly a system for autonomous airborne delivery of a directional fragmentation weapon.

BACKGROUND

Directional fragmentation weapons such as the M18 Claymore Antipersonnel Mine are employed for defense of manned positions or personnel. Such weapons are typically stationary and are limited to engagement of an enemy at close range. The directional capability of the weapons is highly desirable and the basic weapon is readily available in arsenal inventory.

SUMMARY

Implementations disclosed herein provide an anti-personnel autonomous vehicle (APAV) system having a fuselage formed by a directional fragmentation weapon (DFW). An unmanned aerial vehicle (UAV) assembly is engaged to the DFW, the UAV assembly having a plurality of lift units positioned to provide balanced lift on the DFW. A control module integrated in the UAV assembly has a wireless transmitter/receiver communicating with a remote controller.

The implementations disclosed provide a method for enemy engagement with an anti-personnel autonomous vehicle (APAV) wherein a directed fragmentation weapon (DFW) is retrieved and an unmanned aerial vehicle (UAV) assembly is mounted to the DFW. A control module communicates with a remote controller through a wireless transmitter/receiver.

BRIEF DESCRIPTION OF THE DRAWINGS

The features, functions, and advantages of the anti-personnel autonomous vehicle can be achieved independently in various implementations of the present disclosure or may be combined in yet other implementations further details of which can be seen with reference to the following description and drawings.

DETAILED DESCRIPTION

Implementations disclosed herein provide an Anti-Personnel Autonomous Vehicle (APAV) that integrates a directional fragmentation weapon (DFW) such as an M18 Claymore mine into an expendable Unmanned Aerial Vehicle (UAV) or "Attack UAV" to increase the precision firepower of tactical sized military units. The APAV enables inexpensive engagement of ground and maritime targets at near and medium ranges up to 6 km, with an endurance of 15 minutes at speeds up to 90 knots. The APAV incorporates the rigid structure of the DFW as a fuselage. An electric engine quad-copter assembly is engaged to the DFW with a webbing strap securing system having specified lengths and connection locations to accurately self-position on the DFW. A targeting and navigation camera, wireless communications capability and a remote detonator are incorporated in the APAV for operation by a remote controller. The APAV provides Vertical Take-Off and Landing (VTOL) capability to the existing DFW munition with the capability to forward deploy into militarily denied environments. The APAV allows target acquisition and is remotely detonated by the APAV operator.

Figure 1:
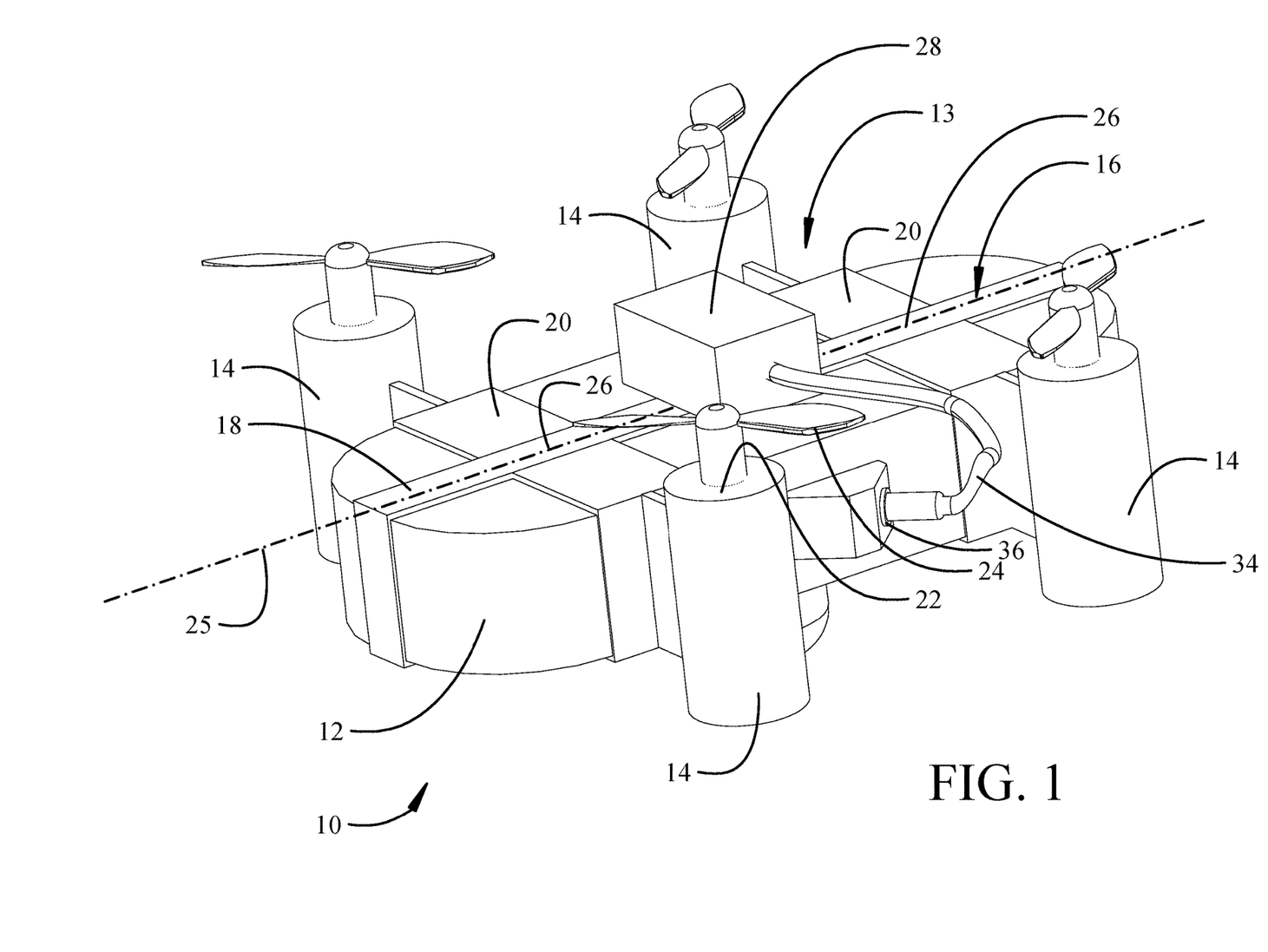
FIG. 1 is an upper view pictorial representation of an anti-personnel autonomous vehicle implementation.
Figure 2:
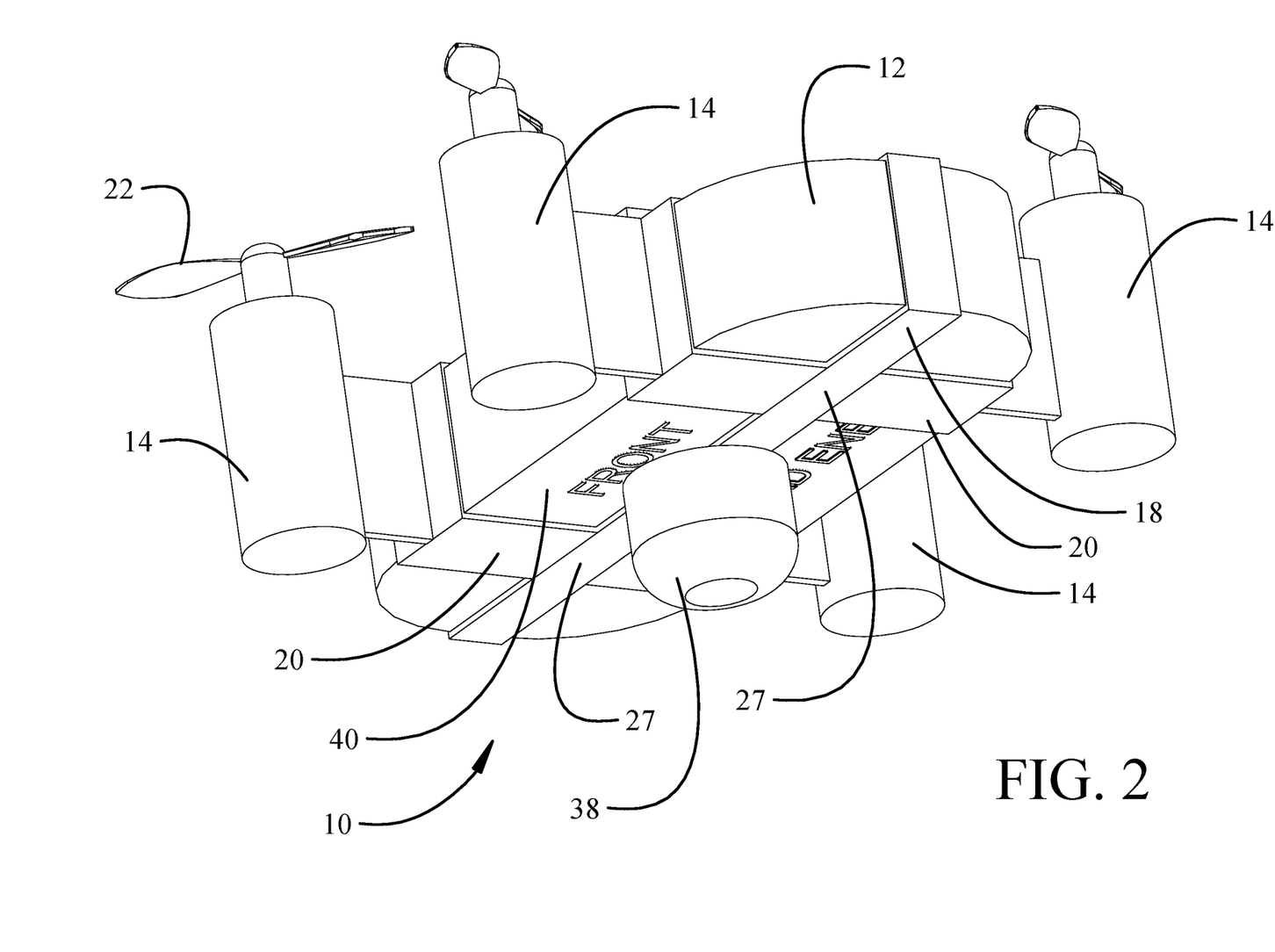
FIG. 2 is a lower view pictorial representation of the implementation of FIG. 1.
Figure 3:
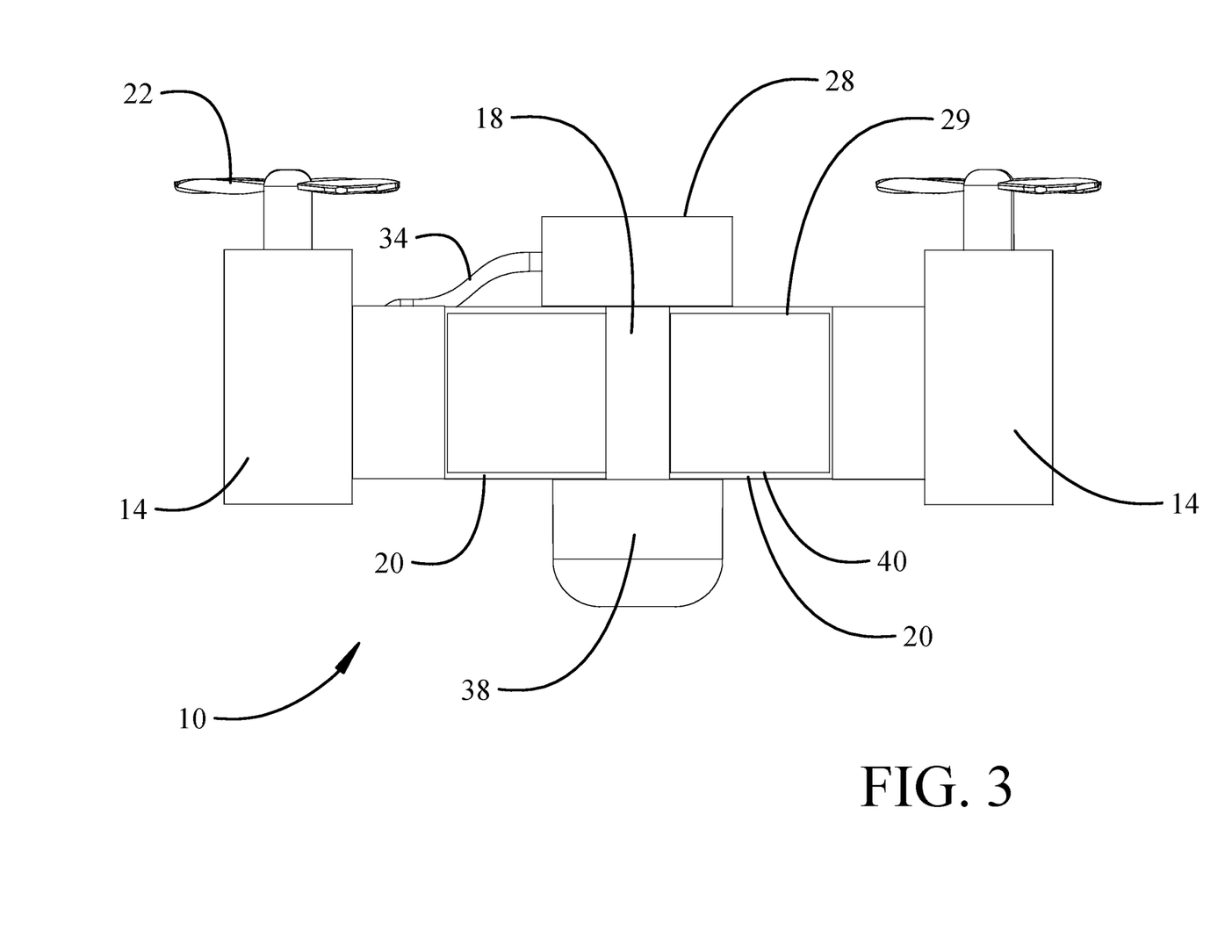
FIG. 3 is an end view of the implementation.
Figure 4:
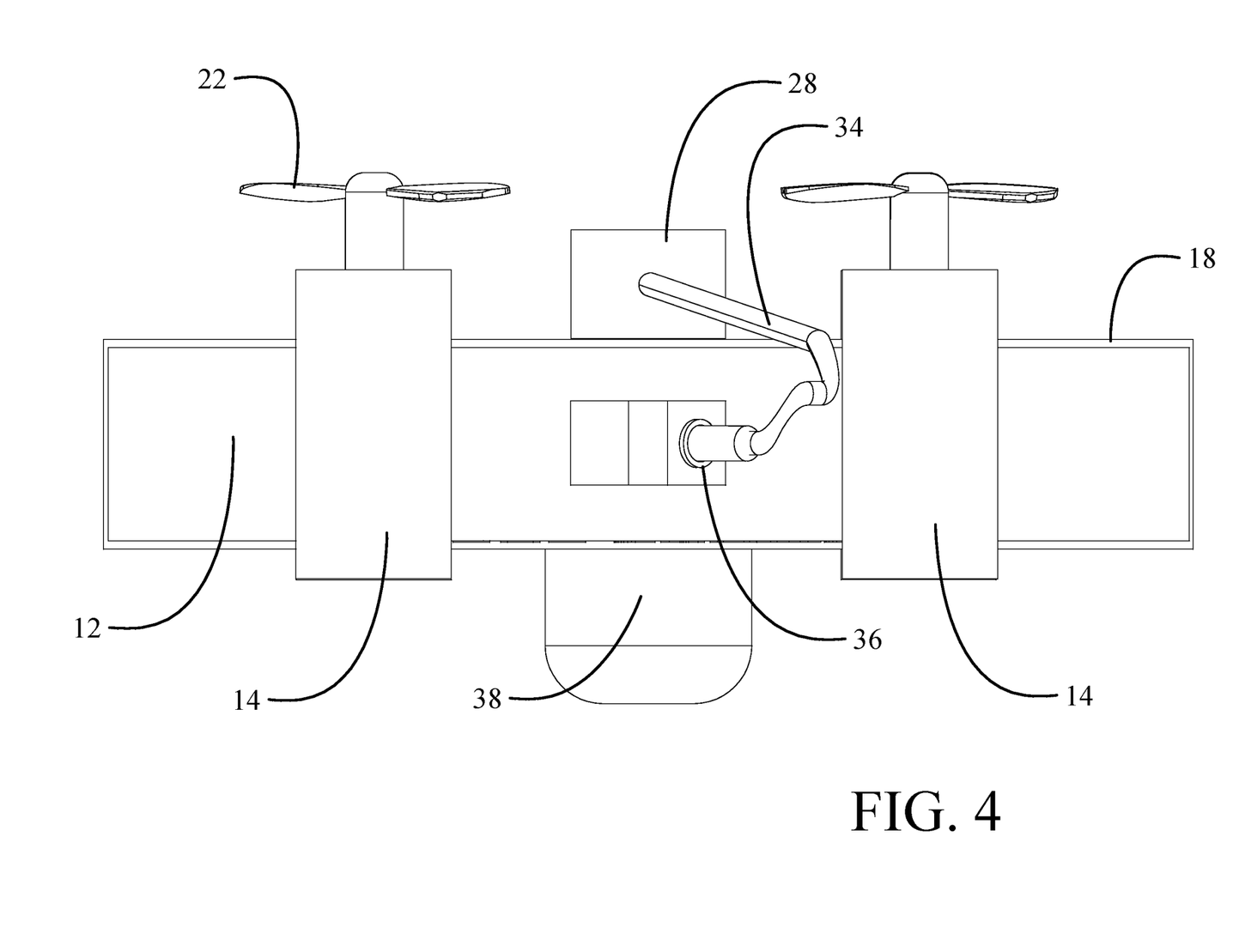
FIG. 4 is a side view of the implementation.
Figure 5:
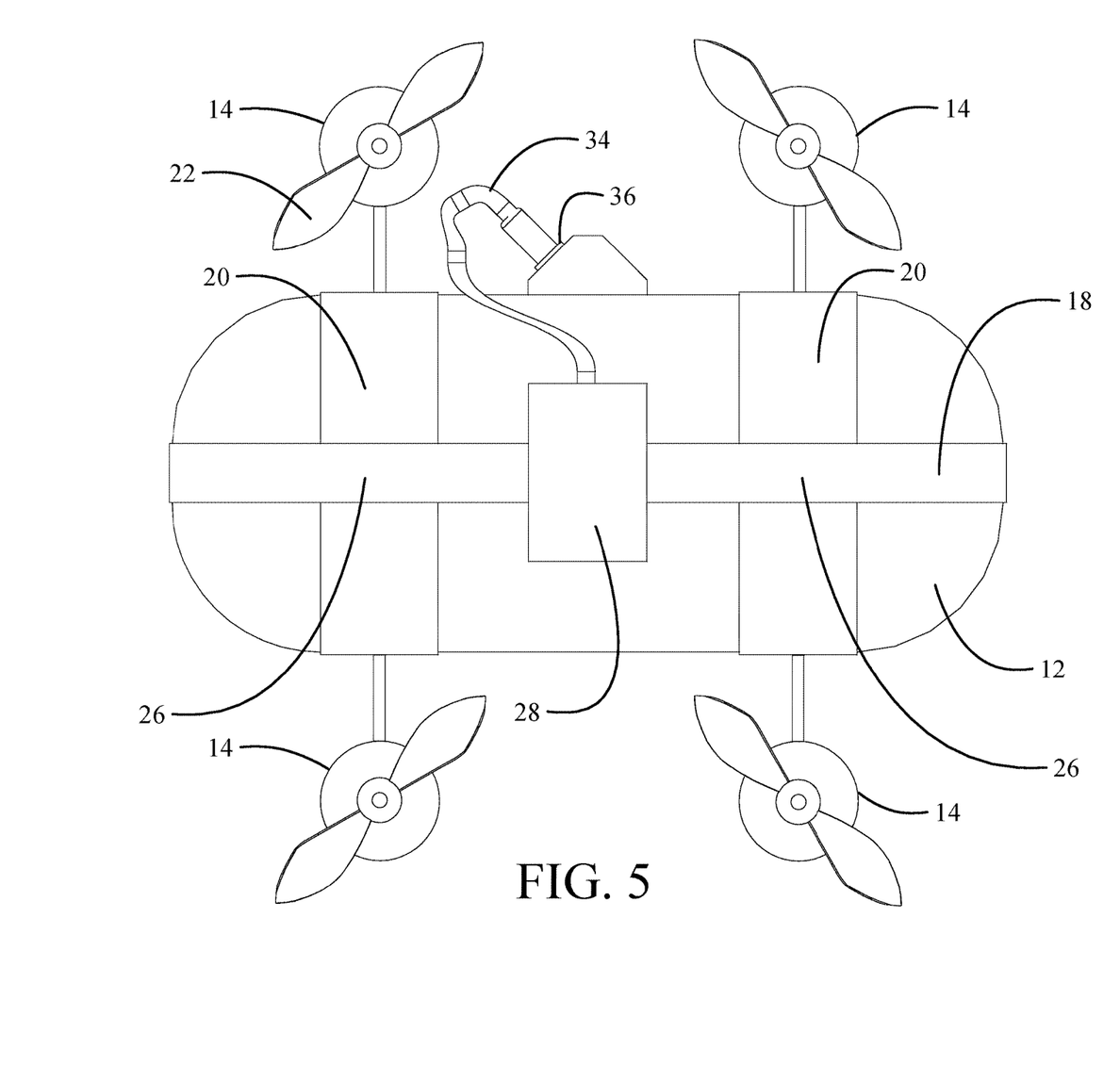
FIG. 5 is a top view of the implementation.
Figure 6:
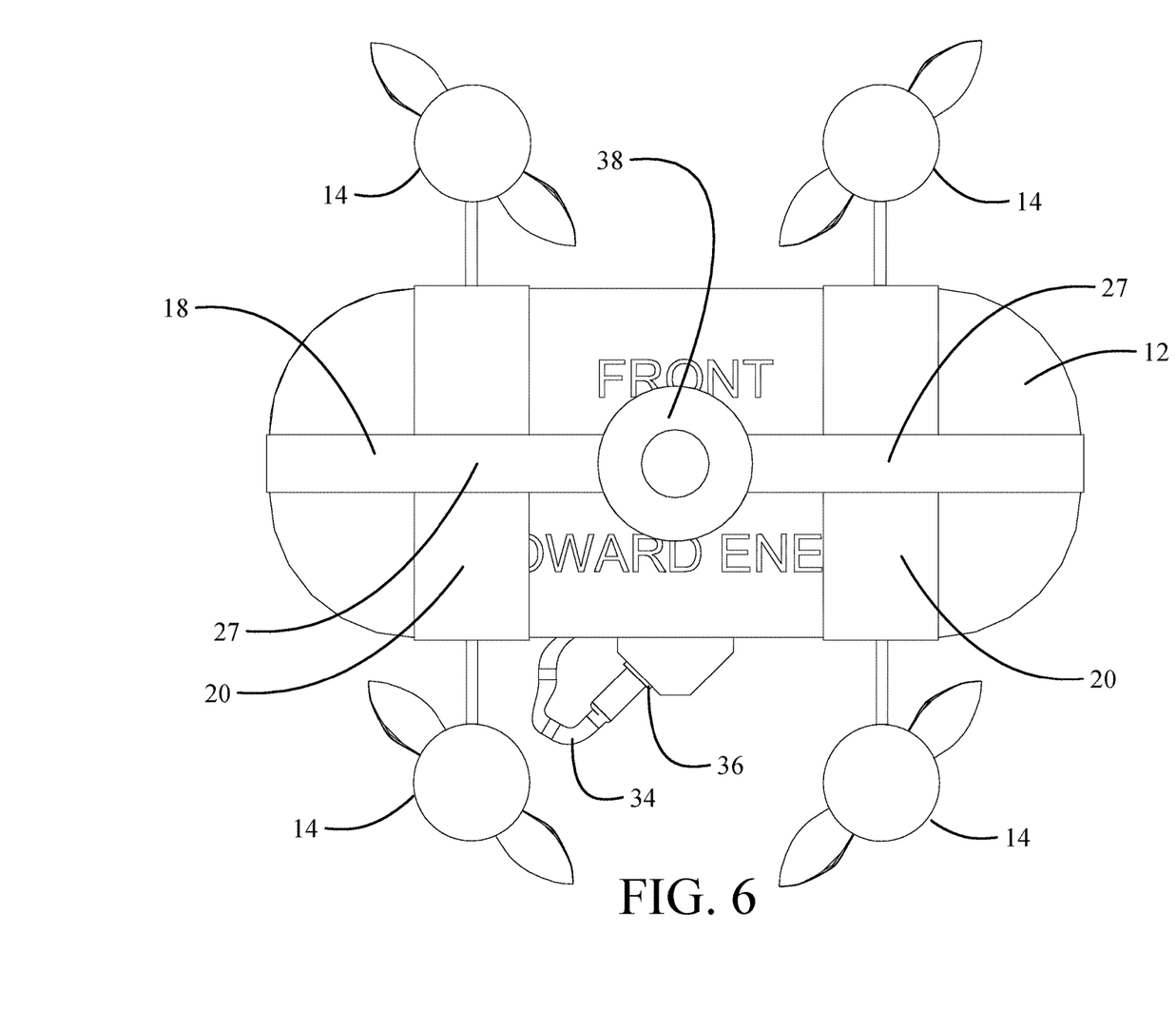
FIG. 6 is a bottom view of the implementation.

Referring to the drawings, FIGS. 1 and 2 show a general arrangement for an exemplary implementation of the APAV 10. DFW 12 is employed as a fuselage structure for a UAV assembly 13 having a plurality of lift units 14 (four for the implementation shown) that are connected to a harness 16 employing at least one longitudinal strap 18 and at least two lateral straps 20 adapted to be engaged around the DFW 12. The lift units 14 each incorporate an electric motor 22 and a propeller 24. The longitudinal strap 18 is sized to be received on the DFW 12 proximate a longitudinal midline 25 with close tolerance and the lateral straps 20 are fixed to the longitudinal strap 18 at connection points 26, 27. For the implementation as shown in the drawings, the two lateral straps 20 extend to engage the lift units 14 in a quadrilateral configuration and the connection points 26, 27 are spaced longitudinally to provide clearance of the propellers 24 in the lift units. Relative positioning of the connection points 26, 27 fixing the longitudinal strap 18 and the lateral straps 20 provides balanced lift by the lift units 14 on the DFW 12. In exemplary implementations the longitudinal strap 18 and the lateral straps 20 may be Nylon® or plastic and may be connected with hook and loop fasteners or buckles to achieve a close tolerance fit on the DFW 12. Lateral straps 20 may be semi-rigid or reinforced to provide structural support rigidly fixing the lift units 14 in a vertical orientation relative to the DFW 12.

As best seen in FIGS. 1 and 3-5, a control module 28 is affixed to the longitudinal strap at a central position intermediate the connection points 26 on an upper surface 29 of the DFW 12. The control module 28, shown in schematic block diagram form in FIG. 7, incorporates a microprocessor 30 or other dedicated computational system for navigation and control of the APAV 10 with electrical connections to the lift units 14 for power control of the motors 22. A wireless transmitter/receiver 32 is included in the control module and interconnected to the microprocessor for communication with a remote controller 33, as will be described in greater detail subsequently with respect to FIG. 8. A detonator connector 34 interconnects the control module 28 with the detonator input receptacle 36 on the DFW 12.

A targeting and navigation camera 38 seen in FIGS. 2-4 and 6 is affixed to the longitudinal strap at a central position intermediate connection points 27 on a bottom surface 40 of the DFW 12. The bottom surface 40 of the DFW designates the operational direction of the DFW blast and is typically marked "Front Toward Enemy". The targeting and navigation camera 38 provides 360° observation capability below the APAV 10 and is connected to the control module 28 for transmission of images through the wireless transmitter/receiver 32 to the remote controller 33.

Figure 7:
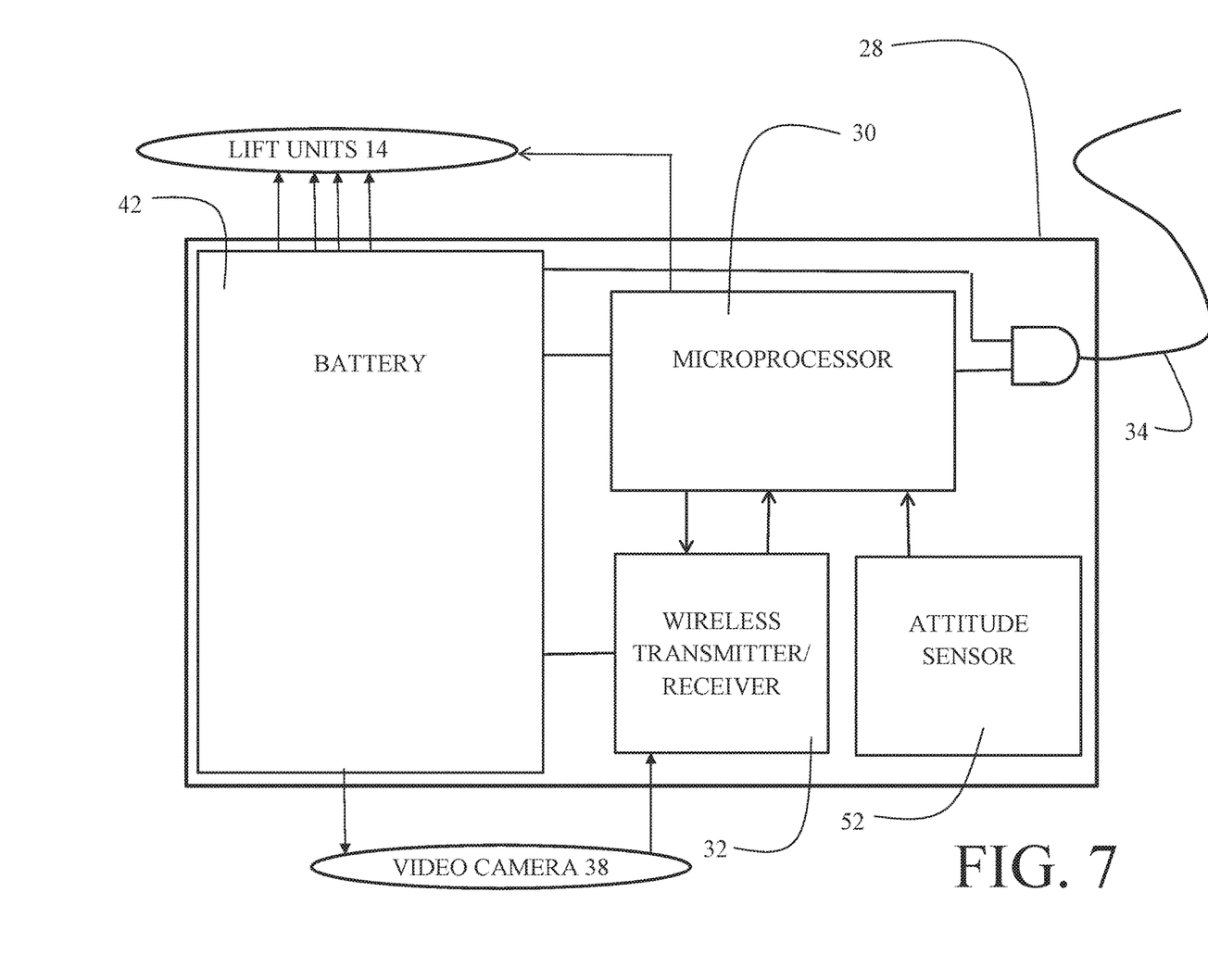
FIG. 7 is a block diagram of the control module.

A power source such as battery 42, seen in FIG. 7, or other energy system such as a miniature fuel cell, is provided in the control module 28 for providing power to the microprocessor 30, wireless transmitter/receiver 32, targeting and navigation camera 38, detonator connector 34 and motors 22 of the lift units 14.

The integrated harness 16 employing longitudinal strap 18 and lateral straps 20 with the fixed connection pointes 26, 27 allows rapid attachment of the UAV assembly 13 onto a standard DFW 12 with predetermined positioning for center of gravity of the overall APAV 10 to provide appropriate weight and balance for operation. In alternative implementations, the lift units 14, control module 28 and targeting and navigation camera 38 may be separately secured to the DFW 12 with clamps or other devices, to eliminate one or more of the straps, using a template positioned or marked on the DFW 12 providing the connection locations that would otherwise be automatically delivered by the integrated harness.

Figure 8:
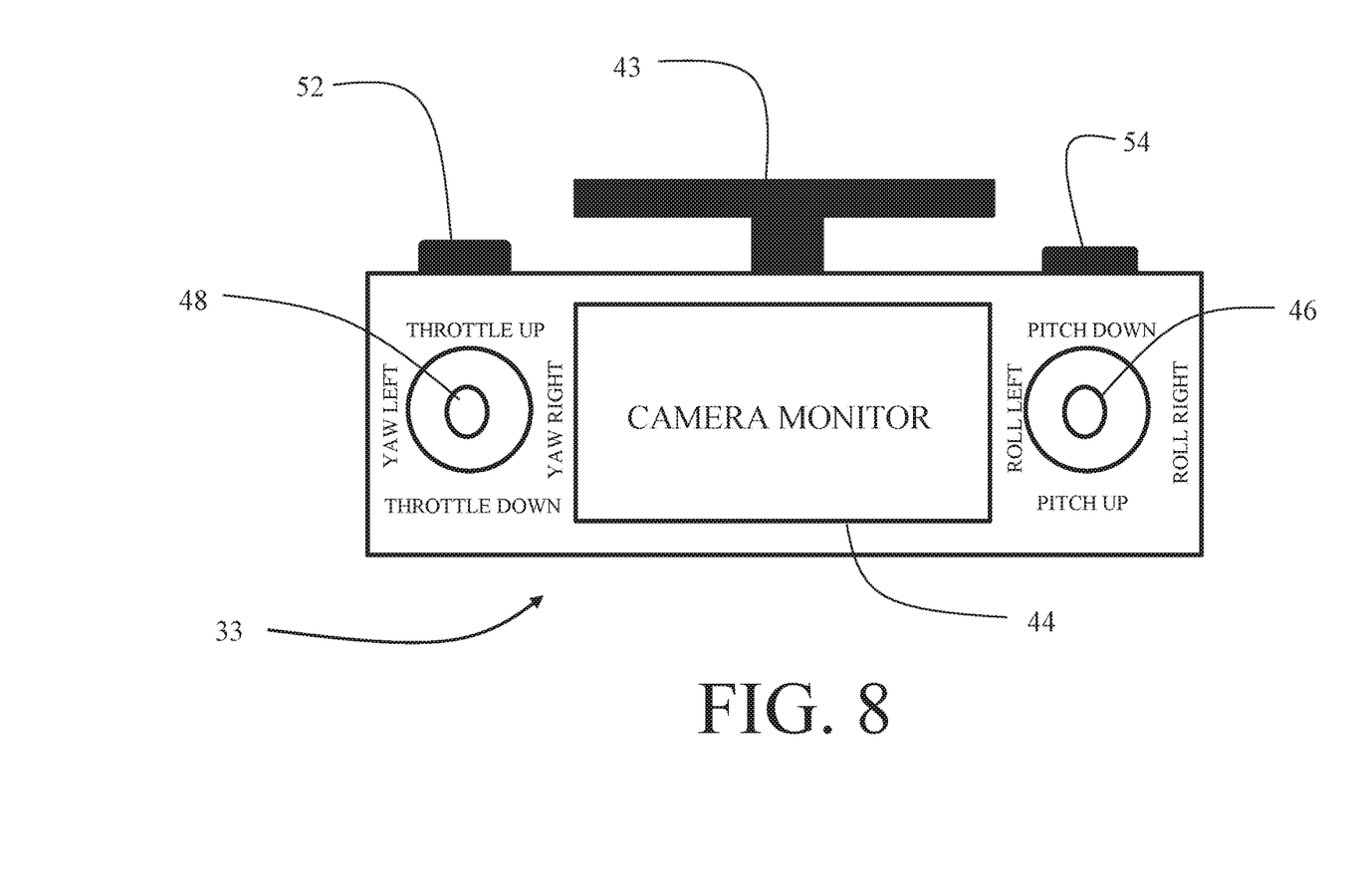
FIG. 8 is a representation of the remote controller.

A remote controller 33, seen in FIG. 8, communicates wirelessly with the APAV 10 through an antenna 43 the wireless transmitter/receiver 32 to provide an operational APAV system. A camera monitor 44 provides visual position and target information from the images provided by the targeting and navigation camera 38 on the APAV 10. An exemplary control arrangement having a right joy stick 46 providing pitch up, pitch down, roll right and roll left command inputs to the microprocessor 30 for transmission to the lift units 14. A left joy stick 48 provides throttle up, throttle down yaw left and yaw right command inputs to the microprocessor 30 for transmission to the lift units 14. The control module 28 may additionally include an attitude sensor 50 such as an attitude and heading reference system (AHRS) providing altitude, orientation and velocity of the APAV 10 and autopilot controls such as a sustain hover input 52 may be employed on the remote controller 33 with effective control of the APAV through the microprocessor 30. A detonator trigger 54 is provided on the remote controller 33 to allow an operator viewing a target on the camera monitor to detonate the DFW 12. Actuation of the detonator trigger 54 transmits a detonate instruction through the wireless transmitter/receiver 42 to the microprocessor 30 which issues a detonate command through the detonator connector 34 to the DFW 12.

Figure 9:
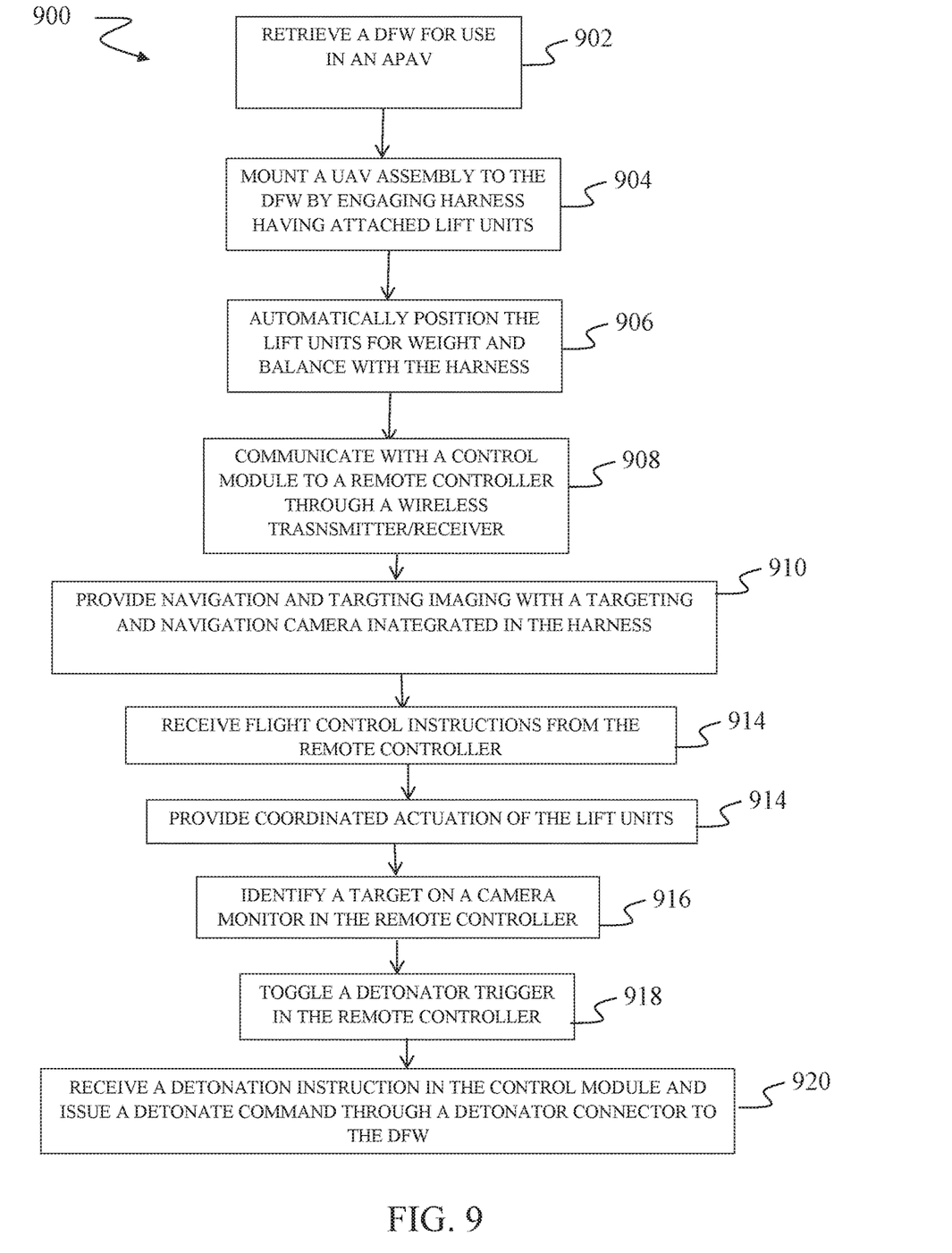
FIG. 9 is a flow chart of a method for engagement of an enemy with an anti-personnel autonomous vehicle of the disclosed implementation.

The disclosed implementations allow a method 900 for enemy engagement with an APAV 10 as shown in FIG. 9. A DFW 12 is retrieved, step 902, and a UAV assembly 13 is mounted to the DFW by engagement of a harness 16 having attached lift units 14, step 904. The harness automatically positions the lift units for proper weight and balance of the APAV 10, step 906. A control module 28 communicates with a remote controller 33 through a wireless transmitter/receiver 42, step 908, providing navigation and targeting imaging with a targeting and navigation camera 38 integrated in the harness 16, step 910, and receiving flight control instructions from the remote controller 33, step 912, to provide coordinated actuation of the lift units 14, step 914. Upon identifying a target image on a camera monitor 44 in the remote controller 33, step 916, an operator toggles a detonator trigger 54, step 918. A resulting detonation instruction is received by the control module and a detonate command issued through a detonator connector 34 to detonate the DFW 12, step 920.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. An anti-personnel autonomous vehicle (APAV) system comprising:
    a fuselage structure consisting of a directional fragmentation weapon (DFW);
    an unmanned aerial vehicle (UAV) assembly comprising a harness employing at least one longitudinal strap and at least two lateral straps adapted to be engaged around the DFW and a plurality of lift units configured for attachment to the DFW in positions to provide balanced lift;
    a control module integrated in the UAV assembly having a wireless transmitter/receiver communicating with a remote controller, said control module engaged to the at least one longitudinal strap at a central position intermediate connection points on an upper surface of the DFW.

2. The APAV system as defined in claim 1 wherein the at least one longitudinal strap is positioned in the harness proximate a midline of the DFW.

3. The APAV system as defined in claim 2 where in the at least two lateral straps are fixed to the at least one longitudinal strap at connection points on an upper surface and a bottom surface of the DFW.

4. The APAV system as defined in claim 3 wherein the plurality of lift units comprises four lift units and at least two lateral straps comprise two lateral straps that engage the four lift units in a quadrilateral configuration and the connection points are spaced longitudinally to provide clearance of propellers in the four lift units.

5. The APAV system as defined in claim 4 wherein relative positioning of the connection points fixing the at least one longitudinal strap and the at least two lateral straps provides balanced lift by the lift units on the DFW.

6. The APAV system as defined in claim 1 wherein the lift units have motors and propellers and the control module comprises.

7. The APAV system as defined in claim 6 wherein the control module further comprises a wireless transmitter and a wireless receiver interconnected to the microprocessor for communication with the remote controller.

8. The APAV system as defined in claim 7 wherein the control module further comprises a detonator connector interconnecting the control module with a detonator input receptacle on the DFW.

9. The APAV system as defined in claim 8 wherein the control module further comprises a power source connected to provide power to the microprocessor, wireless transmitter, the wireless receiver, detonator connector and the motors of the lift units.

10. The APAV system as defined in claim 1 further comprising a targeting and navigation camera affixed to the at least one longitudinal strap at a central position intermediate the connection points on a bottom surface of the DFW.

11. The APAV system as defined in claim 10 wherein the control module comprises:
    a microprocessor;
    a wireless transmitter and a wireless receiver interconnected to the microprocessor for communication with the remote controller, and, the targeting and navigation camera is connected to the microprocessor whereby images from the targeting and navigation camera are transmitted to the remote controller.

12. The APAV system as defined in claim 11 wherein the control module further comprises a power source connected to provide power to targeting and navigation camera.

13. An anti-personnel autonomous vehicle (APAV) comprising:
   a fuselage structure consisting of a directional fragmentation weapon (DFW);
   a unmanned aerial vehicle (UAV) assembly having
      a harness employing a longitudinal strap and two lateral straps adapted to be engaged around the DFW;
      four lift units having motors and propellers, said lift units connected to the lateral straps, said lateral straps fixed to the longitudinal strap at connection points positioned to provide balanced lift on the DFW and clearance of the propellers;
   a control module integrated in the UAV assembly, said control module having
      a wireless transmitter and a wireless receiver;
      a microprocessor connected to the wireless transmitter/receiver for navigation and control with electrical connections to the lift units for power control of the motors;
      a detonator connector interconnecting the control module with a detonator input receptacle on the DFW;
   a targeting and navigation camera affixed to the longitudinal strap at a central position intermediate the connection points on a bottom surface of the DFW, the targeting and navigation camera connected to the microprocessor whereby images from the targeting and navigation camera are transmitted through the wireless transmitter/receiver; and
   a battery incorporated in the control module and connected to provide power to the microprocessor, wireless transmitter/receiver, detonator connector and motors of the lift units.

14. A method for enemy engagement with an anti-personnel autonomous vehicle (APAV) comprising:
   retrieving a directed fragmentation weapon (DFW);
   mounting an unmanned aerial vehicle (UAV) assembly comprising a plurality of lift units to the DFW, wherein the DFW is employed as a fuselage, and a harness employing at least one longitudinal strap and at least two lateral straps adapted to be engaged around the DFW and
   communicating through a control module with a remote controller through a wireless transmitter and a wireless receiver, wherein the control module is engaged to the at least one longitudinal strap at a central position intermediate connection points on an upper surface of the DFW.

15. The method as defined in claim 14 further wherein mounting the UAV assembly to the DFW comprises:
   engaging the harness having attached lift units;
   positioning the lift units automatically with the harness for proper weight and balance of the APAV.

16. The method as defined in claim 15 further comprising:
   providing navigation and targeting imaging with a camera integrated in the harness; and
   receiving flight control instructions from the remote controller;
   providing coordinated actuation of the lift units through the control module responsive to the flight control instructions.

17. The method as defined in claim 16 further comprising:
   identifying a target image on a camera monitor in the remote controller; and
   toggling a detonator trigger.

18. The method as defined in claim 17 further comprising;
   receiving a resulting detonation instruction by the control module; and
   issuing a detonate command through a detonator connector to detonate the DFW.

* * * * *